United States Patent [19]

Herrmann et al.

[11] Patent Number: 5,426,701
[45] Date of Patent: Jun. 20, 1995

[54] CABLE TELEVISION CONVERTER BOX WITH A SMART CARD CONNECTOR UNDERNEATH

[75] Inventors: Charles Herrmann, Elkins Park, Pa.; Stephen G. Miggels, Wyckoff, N.J.

[73] Assignee: General Instrument Corporation of Delaware, Hataboro, Pa.

[21] Appl. No.: 202,786

[22] Filed: Feb. 28, 1994

[51] Int. Cl.⁶ .............................................. H04L 9/00
[52] U.S. Cl. ..................................... 380/52; 348/10; 455/6.2; 380/16
[58] Field of Search .................. 380/10, 16, 22, 23, 380/25, 52; D14/125; 312/7.2; 348/5.5, 10; 235/492; 455/6.2

[56] References Cited

U.S. PATENT DOCUMENTS

| | | | |
|---|---|---|---|
| D. 271,765 | 12/1983 | Nordberg | D14/77 |
| D. 274,189 | 6/1984 | Norberg | D14/84 |
| D. 288,926 | 3/1987 | Zierhut | D14/84 |
| D. 289,871 | 5/1987 | Besford | D14/84 |
| D. 295,174 | 4/1988 | Abe et al. | D14/84 |
| D. 295,862 | 5/1988 | Yonekura et al. | D14/84 |
| D. 313,230 | 12/1990 | Issacs | D14/125 |
| D. 323,823 | 2/1992 | Yonekura | D14/125 |
| D. 347,631 | 6/1994 | Terleski | D14/125 |
| 4,523,297 | 6/1985 | Ugon et al. | 364/900 |
| 4,529,870 | 7/1985 | Chaum | 380/23 X |
| 4,684,791 | 8/1987 | Bito | 235/380 |
| 4,843,226 | 6/1989 | Kato et al. | 235/492 |
| 4,882,473 | 11/1989 | Bergeron et al. | 235/380 |
| 4,908,834 | 3/1990 | Wiedemer | 380/5 |
| 4,993,066 | 2/1991 | Jenkins | 380/16 |
| 5,036,430 | 7/1991 | Hills | 361/399 |
| 5,061,845 | 10/1991 | Pinnavaia | 235/492 |
| 5,111,504 | 5/1992 | Esserman et al. | 380/21 |
| 5,144,663 | 9/1992 | Kudelski et al. | 380/16 |
| 5,204,512 | 4/1993 | Ieki et al. | 235/382 |
| 5,237,610 | 8/1993 | Gammie et al. | 380/10 |
| 5,242,310 | 9/1993 | Leung | 439/76 |
| 5,276,317 | 1/1994 | Ozouf et al. | 235/486 |
| 5,310,998 | 5/1994 | Okuno | 235/492 X |
| 5,367,571 | 11/1994 | Bowen et al. | 348/10 |

FOREIGN PATENT DOCUMENTS 0140705  5/1985  European Pat. Off. .............. 380/10

OTHER PUBLICATIONS

Book by John McCrindle, entitled "Smart Cards", published by IFS Ltd., Springer-Verlag, 1990, pp. 21–32.

Primary Examiner—Tod R. Swann
Attorney, Agent, or Firm—Irwin Ostroff; Erwin W. Pfeifle

[57] ABSTRACT

A Cable Television (CATV) Converter box or computer has a Smart Card connector mounted in a bottom wall thereof. The Converter box includes a case having a top wall, the bottom wall, and four side walls, a main printed circuit (PC) board mounted within the Converter box and parallel to the top and bottom walls thereof, and a Smart Card connector. The Smart Card connector is mounted directly onto the PC board and within a protrusion of the bottom wall of the Converter box. The Smart Card connector defines an opening which is aligned with a first end of a groove defined in the bottom wall of the case for receiving a Smart Card storing a predetermined signal security decrypting algorithm. A second end of the groove is either formed in one of the side walls of the device or in the bottom wall of the case. The Smart Card is installed by inserting the Smart Card in the groove and placing it into contact with the Smart Card connector.

15 Claims, 3 Drawing Sheets

CABLE TELEVISION CONVERTER BOX WITH A SMART CARD CONNECTOR UNDERNEATH

FIELD OF THE INVENTION

The present invention relates to Smart Card connectors in devices such as Cable Television (CATV) converters boxes and computers requiring security.

BACKGROUND OF THE INVENTION

There are many techniques for controlling the remote descrambling of, for example, scrambled television signals. Such techniques are necessary to maintain security in subscription television systems, including Cable Television (CATV) systems and satellite television systems. Typically a system subscriber is provided with a descrambler connected between a television signal source (e.g., a cable feed or a satellite receiver) and a television set. Each subscriber's descrambler is controlled by the system operator to enable or disable the receipt of specific services such as Home Box Office TM, Showtime TM, or special Pay-Per-View TM events. In this regard, see for example, U.S. Pat. Nos. 5,111,504 (J. Esserman et al.), issued on May 5, 1992, 5,144,663 (A. Kudelski et al.), issued on Sep. 1, 1992, and 5,237,610 (K. Gammie et al.), issued on Aug. 17, 1993.

A Smart Card typically has a programmable circuit that contains a proprietary algorithm for decrypting or descrambling purposes that is stored in a memory section as, for example, Static Random Access Memory (SRAM) chips or the like forming a confidential or secret portion of the Smart Card memory. It is typically about the size and shape of a credit card and provides security or piracy protection of provided services. The Smart Card is a renewable security device that has recently been used for CATV converter boxes in order to prevent a stealing of services. It is meant to be removed only when the CATV company providing the services decides to update the proprietary decrypting algorithm, which usually occurs after the decrypting algorithm is broken by an unauthorized user. Additionally, the inadvertent removal of the Smart Card renders the CATV Converter non-functional. It is known to add a port in the top or in one side of a device into which a Smart Card or other type of credit card shaped information card is plugged.

U.S. Pat. No. 4,908,834 (J. Wiedemer), issued on Mar. 13, 1990, discloses a technique for inserting a removable memory module that is inserted into a slot associated with a decoder in the top surface of a television receiver. The removable memory module includes a fixed, receiver-unique, external code which is combined with an internal code of the proper receiver to generate the appropriate system code in the receiving station.

U.S. Pat. No. 5,204,512 (T. Ieki et al.), issued on Apr. 20, 1993, discloses a system for controlling communications between electronic information cards, such as IC-cards, and a host computer that are to be kept secret. To protect data, the data from a transmitter is enciphered prior to being sent, and deciphered prior to being read out at the host computer end. To provide such protection, a device is provided having at least a first connector for a first IC-card storing an algorithm for enciphering the data, and a second IC-card or cards for making communication with the host computer. The first IC-card is readily changeable with a new first IC-card that stores another algorithm when the original algorithm is compromised by an unauthorized person.

A problem when a Smart Card is mounted in the port in the side or top of a device such as a CATV converter box is that the Smart card is easily accessible to children and others, and to an inadvertent removal or bumping which can cause the device to become non-functional. It is expected that the amount and diversity of services provided by cable or communication companies will increase in the future and to include, for example, the transmission of computer data and a greater quantity of television programming. To accommodate the existing and new services, a converter box will require many more ports than presently exist. This will reduce the space available for including a separate port for a Smart Card and, in turn, the protection of the various provided services from being securely transmitted to a subscriber.

It is desirable to provide a Smart Card connector in a CATV Converter box, or other device requiring security, which reduces the inadvertent removal of the Smart Card and use of valuable space in the device which is needed for circuitry and components for processing information.

SUMMARY OF THE INVENTION

The present invention is directed to a technique for mounting a Smart Card connector in devices such as Cable Television (CATV) converters that receive communication signals that have been encrypted or scrambled. Viewed from one aspect, the present invention is directed to a device for receiving communication signals that have been encrypted based on a predetermined encrypting algorithm. The device comprises a printed circuit (PC) board, an information card connector, and a case comprising a top wall, a bottom wall defining a rectangular groove therein having first and second ends, and four side walls coupling the top and bottom walls. The PC board is mounted within the case and comprises printed wiring formed thereon and circuit components disposed thereon which are electrically coupled to the printed wiring. The circuit components operate, inter alia, to decrypt the received encrypted communication signals. The information card connector comprises an opening at a first end thereof, and terminal means. The information card connector defines an opening at a first end thereof which is aligned with the first end of the groove in the bottom wall of the case for receiving an information card storing a decrypting algorithm based on the predetermined encrypting algorithm. The terminal means electrically couples the information card with the information card connector and the printed wiring on the printed circuit board. The information card is installed by placing it in the groove and into contact with the information card connector.

Viewed from another aspect, the present invention is directed to a device for receiving encrypted communication signals based on a predetermined encrypting algorithm. The device comprises a printed circuit (PC) board, an information card connector, and a case comprising a top wall, a bottom wall defining a rectangular groove therein having first and second ends, and four side walls coupling the top and bottom walls. The PC board is mounted within the case and has first and second major surfaces which are substantially parallel to the bottom wall of the case. The PC board comprises printed wiring formed on at least one of the major surfaces, and circuit components disposed on at least one of the major surfaces electrically coupled to the printed wiring, the circuit which are components operating to decrypt the received communication signals. The information card connector defines an opening therein, and comprises mounting tabs, electrical connectors, and terminal means. The opening is defined at a first end of the information card connector and is aligned with the first end of the groove in the bottom wall of the case. The opening is provided for receiving an information card storing a predetermined decrypting algorithm that is based on the predetermined encrypting algorithm that has been placed in the groove and in contact with the information card connector. The mounting tabs securely mount the information card connector to the printed circuit board. The electrical connectors electrically couple the information card connector with predetermined power leads and predetermined signal carrying leads of the printed wiring on the printed circuit board so as to transfer information between the information card connector and the circuit components of the printed circuit board. The terminal means electrically couples the information card with the electrical connectors of the information card connector.

The invention will be better understood from the following more detailed description taken with the accompanying drawings and claims.

The drawings are not necessarily to scale.

DETAILED DESCRIPTION

It is to be understood that corresponding elements having the same function in the several views of the drawings are provided with the same designation numbers. The present invention is described hereinafter for use in Cable Television (CATV) Converter boxes. However, it is to be understood that the technique described hereinafter of mounting a Smart Card in a CATV Converter box in accordance with the present invention can be used for similarly mounting a Smart Card or similar information carrying card in any other device such as a computer requiring security measures for the transmission or reception of encrypted communication signals.

Figure 1:
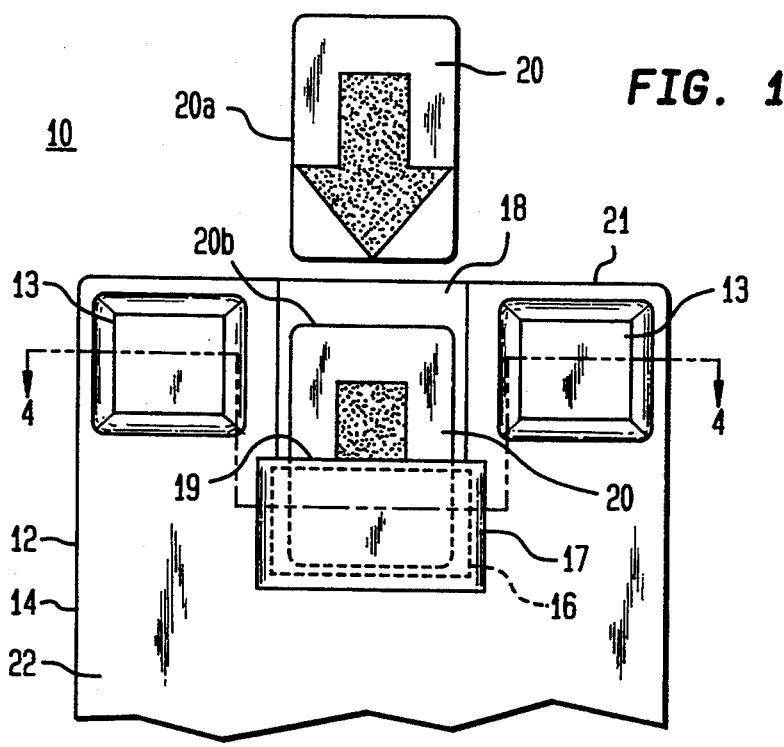
FIG. 1 is a partial bottom view of an exemplary Cable Television (CATV) converter box comprising a Smart Card connector in accordance with a first embodiment of the present invention.

Referring now to FIG. 1, there is shown a partial bottom view of an exemplary Cable Television (CATV) Converter box 10 in accordance with a first embodiment of the present invention which shows the box 10 with a Smart Card 20 in a position 20a which is outside the box 10 and in a position 20b which is inside a portion of the box 10. The CATV Converter box 10 comprises a case 12 having four feet 13 (only two of which are shown) on a bottom wall 22 thereof, and a wall 14 at a front side of the box 10, a Smart Card connector 16 (shown within a dashed-line rectangle) mounted within an outwardly shaped protrusion 17 (shown as a solid line rectangle) in the bottom wall 22 of the case 12, and a guide slot 18 formed in the bottom wall 22 of the case 12 leading to an opening 19 which facilitates inserting the Smart Card 20 into the opening 19 of the Smart Card connector 16. The guide slot 18 is shown as extending from a right-hand side wall 21 of the Converter box 10 to the opening 19 in the Smart Card connector 16. The Smart card 20 is shown located both external to the Converter Box 10 at location 20a prior to being inserted into the guide slot 18, and at location 20b when connected to the Smart Card connector 16 by being partially located within the guide slot 18 and partially located within the Smart Card connector 16 (as shown by the dashed-line rectangle). The Smart Card connector 16 can comprise any suitable connector 16 that is compatible with the particular Smart Card 20 being used. For example, an Amphenol model 74540-1 Rev. C connector is usable with a General Instrument "CipherCard TM " (Smart Card).

The Smart card 20 is a well-known element that is used for many purposes. In general, the Smart Card 20 comprises a microprocessor chip (not shown) including a Read Only Memory (ROM) (not shown) for storing program instructions, a Random Access Memory (RAM) (not shown) which is used as a scratch pad memory, and a secret or confidential memory section (not shown) that cannot be externally accessed or written into once initially programmed for storing information as, for example, subscriber data and a signal decrypting algorithm. A Smart Card is shown and described in, for example, Chapter 3 of the book "Smart Cards" by John McCrindle, published by IFS Ltd, Springer-Verlag, 1990, at pages 21-32, and is incorporated herein by reference.

In operation, the Smart Card 20 is inserted into the guide slot 18 and the Smart Card connector 16 by a Cable company prior to distribution of the Converter box 10 to a cable subscriber. The cable subscriber is informed by instructions with the Converter box 10 where the Smart Card 20 is located, and is instructed to never remove the Smart Card 20 unless instructions are provided by the Cable company to do so. Should the signal decrypting algorithm forming part of the secret or confidential memory section of the Smart Card 20 be compromised by an unauthorized person, the Cable company then provides a new Smart Card 20 to the authorized cable subscriber with a new decrypting algorithm thereon, and instructions for the subscriber to replace the Smart Card 20 presently in the Cable Converter box 10 with the newly received Smart Card 20. Replacement of the Smart Card 20 involves (a) the sliding of the original Smart Card 20 in the guide slot 18 outwards from the Smart Card Connector 16 until it is free of the connector 16, and (b) the placing of the new Smart Card 20 in the guide slot 18 and sliding it into the Smart Card connector 16 as far as possible.

The placement of the Smart Card connector 16 underneath the Converter box 10 provides a first space-saving advantage because the Smart Card connector 16 is positioned in an area of the Converter box 10 not normally used for other components. A second advantage is that the Smart Card 20 is less likely to be noticed when placed underneath the Converter box 10. This makes it more child-proof, and less subject to an inadvertent removal or bumping of the Smart Card 20.

Figure 2:
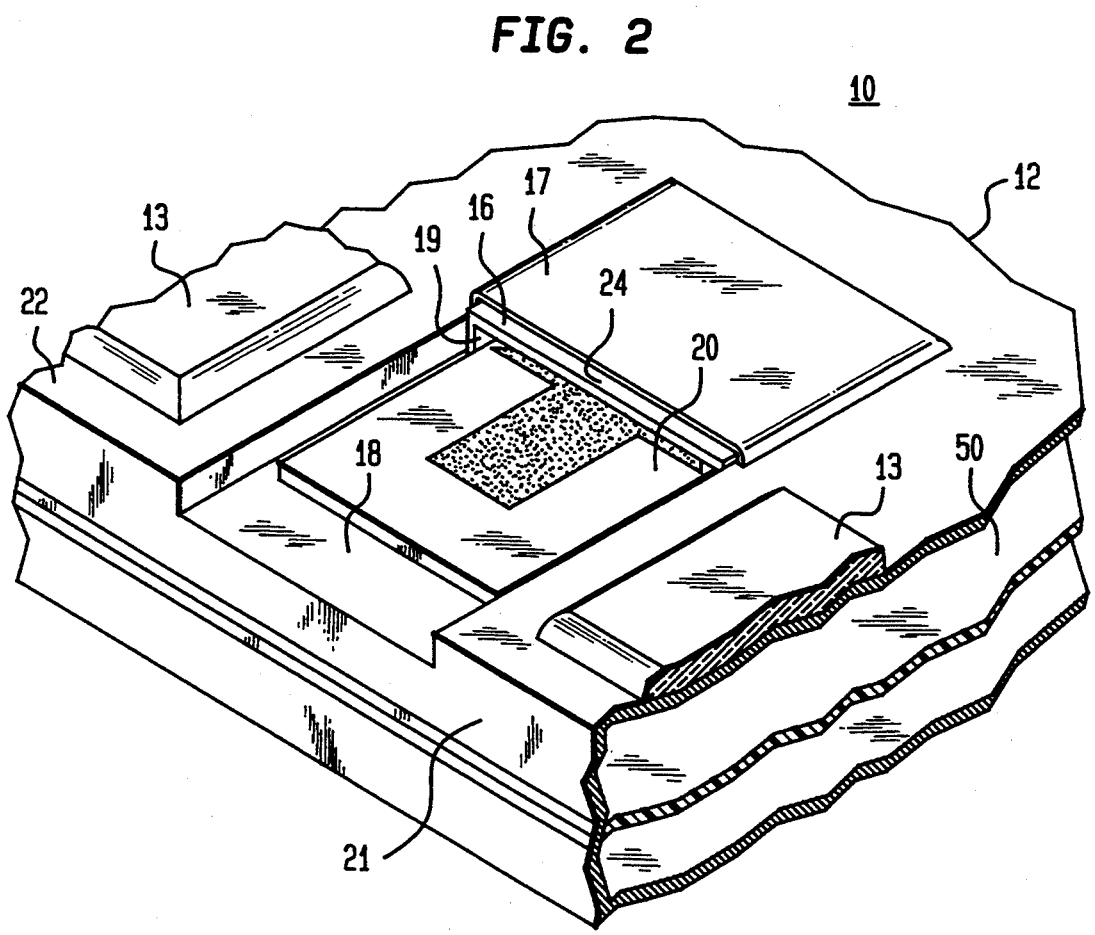
FIG. 2 is a perspective view of a portion of the bottom of the Exemplary CATV converter box of FIG. 1 including the area of the Smart Card connector.

Referring now to FIG. 2, there is shown a partial enlarged perspective view of the bottom of the Converter box 10 of FIG. 1. More particularly, the guide slot 18 extends between the feet 13 from the right side wall 21 of the case 12 to the opening 19 of the Smart Card connector 16. The guide slot 18 is slightly wider than the width of the Smart Card 20 in order to accommodate the Smart Card 20 as it is inserted into the opening 19 of the Smart Card connector 16. The opening 19 of the Smart Card Connector 16 is located in an aperture 24 in the protrusion 17 in the bottom wall 22 of the case 12. The feet 13 are used to support the case 12 on a predetermined surface (not shown) on which the case 12 is to be placed, each foot 13 extending a first predetermined distance from the bottom wall 22 of the case 12. The protrusion 17 extends from the bottom wall 22 of the case 12 by a second distance which is equal to or less than the first distance of the plurality of the feet 13. The protrusion 17 uses the previously unused area between feet 13 and thus saves area in the case 12 for other components.

Figure 3:
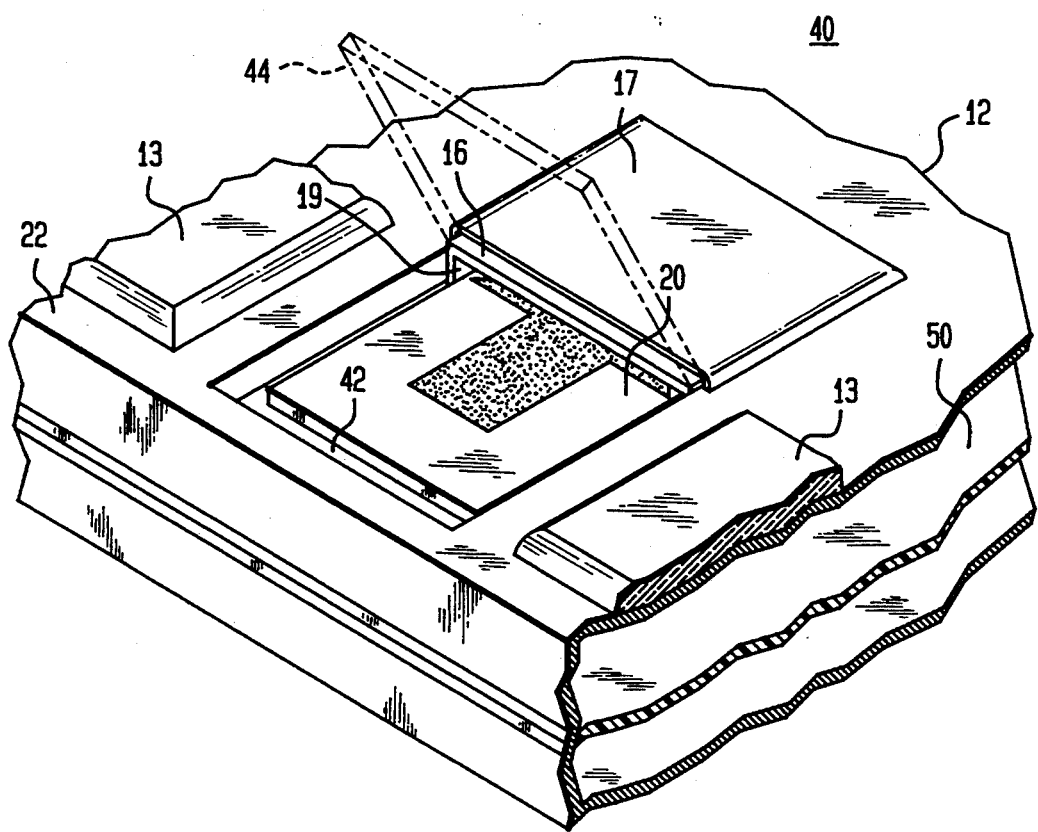
FIG. 3 is a perspective view of a portion of the bottom of an exemplary CATV converter box similar to FIG. 2 including the area of the Smart Card connector in accordance with a second embodiment of the present invention.

Referring now to FIG. 3, there is shown a perspective view of a portion of the bottom of a Converter box 40 in accordance with a second embodiment of the present invention with a Smart Card 20 inserted in a portion thereof. The Converter box 40 comprises a case 12 including feet 13 and a protrusion 17, a Smart Card connector 16 disposed below the protrusion 17, and a guide slot 42 for inserting a Smart Card 20 into the Smart Card connector 16. Converter box 40 is very similar to the Converter box 10 of FIG. 1, except that a guide slot 42 defined by a bottom wall 22 of the Converter box 40 does not extend from the Smart Card connector 16 all the way to a side wall of the Converter box 40 as does the guide slot 18 in the Converter box 10 of FIG. 1. It is to be understood that the guide slot 42 is longer than the length of the Smart Card 20 so that the Smart Card 20 can be placed into the guide slot 42 and slid into the Smart Card connector 16. Still further, an optional hinged cover 44 (shown in dashed lines) can be included which extends from the protrusion 17 to cover the guide slot 42 when the cover 44 is closed. It is to be understood that the optional cover 44 is temporarily securable to the bottom of the case 12 by any suitable means such as, for example, a screw (not shown) or a tab (not shown) on the cover 44 which provides a frictional fit to a side wall or end of the guide slot 42. The addition of the cover 44 prevents the Smart Card 20 from being seen and from being inadvertently removed after the Smart Card 20 is installed in the Smart Card connector 16. It is to be further understood that a cover similar to the cover 44 can be used for covering the guide slot 18 of the Converter box 10 of FIG. 1.

Figure 4:
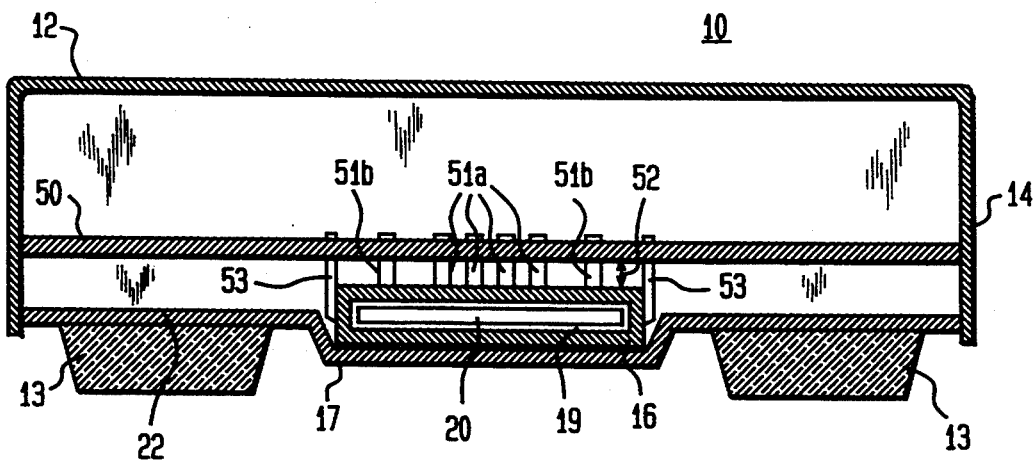
FIG. 4, is a cross-sectional view along dashed line 4—4 of the CATV converter box of FIG. 1.

Referring now to FIG. 4, there is shown a cross-sectional view along dashed line 4—4 of the Converter box 10 of FIG. 1. The Converter box 10 comprises a case 12 with feet 13 and a protrusion 17, a Smart Card Connector 16, and a Printed Circuit (PC) board 50. The PC board 50 is mounted within the case 12 substantially parallel to a bottom wall 22 of the case 12, and includes various circuits (not shown) that permit the Converter box 10 to operate properly for its intended use. The Smart Card connector 16 is mounted to the Printed Circuit (PC) board 30 preferably with a gap 52 therebetween which is fixed by standoffs (spacers 57 shown in FIG. 5 only) molded into the Smart Card connector 16.

The Smart Card connector 16 defines the opening 19 for inserting the Smart Card 20, and comprises a predetermined number of electrical connectors 51a and 51b which span a gap 52 between the connector 16 and the PC board 50 and make electrical connection to printed wiring (not shown) on the PC board 50, and mounting tabs 53 for mounting the connector 16 to the PC Board 50 and creating the gap 52. It is to be understood that the mounting of the Smart Card connector 16, as shown in FIG. 4, is similar to the mounting of the Smart Card connector 16 shown in FIG. 3. Such mounting (a) limits the use of valuable "real estate" on the main PC board 50 of the Converter box 10 or 40, and (b) provides an out-of-the-way location for mounting the Smart Card 20 and its connector 16 to avoid the Smart Card 20 from being easily seen or inadvertently removed.

Figure 5:
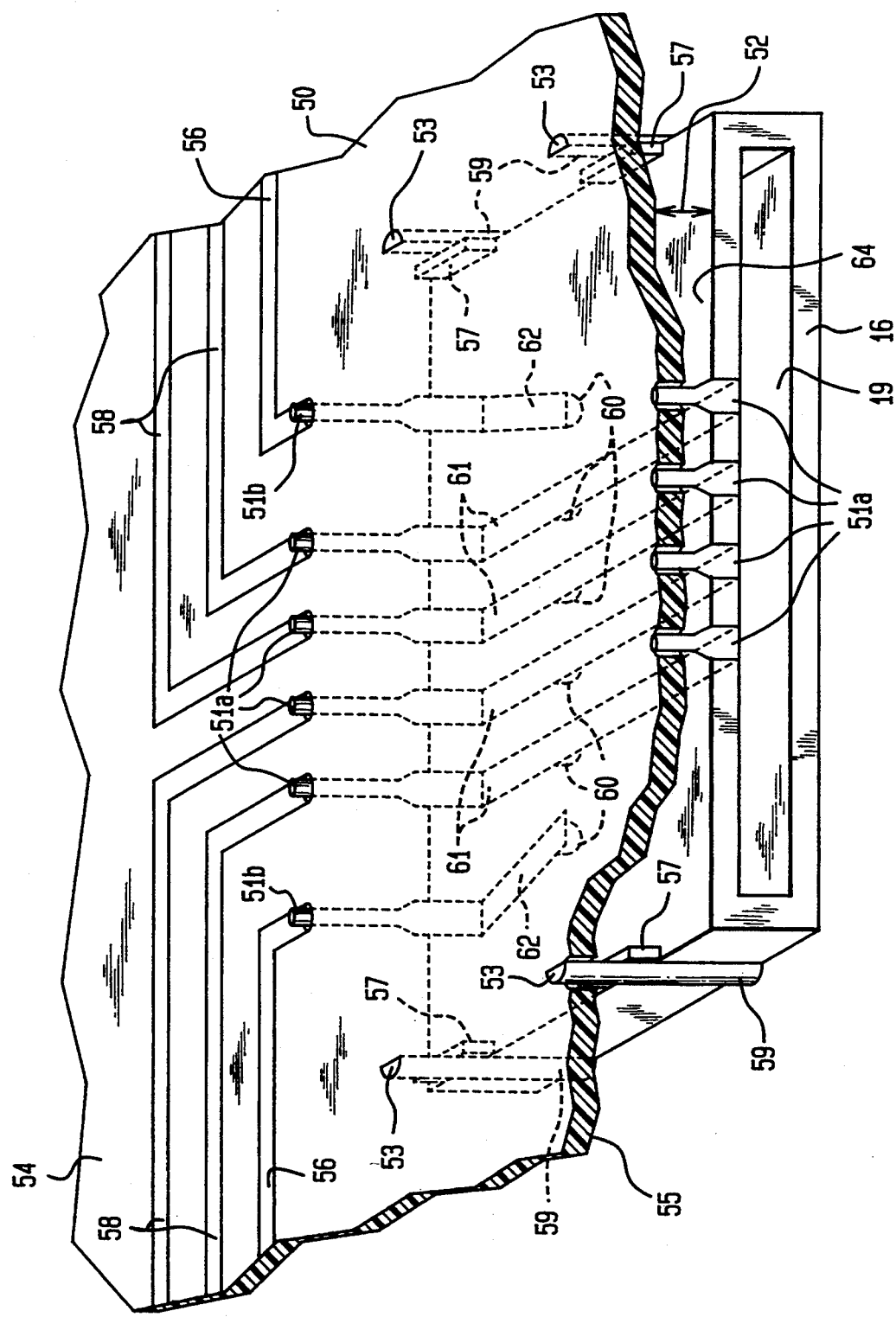
FIG. 5 is a perspective view of a Smart Card connector mounted to a main Printed Circuit (PC) board in accordance with the present invention.

Referring now to FIG. 5, there is shown an enlarged perspective view of a portion of a main Printed Circuit (PC) board 50 of the Converter box 10 of FIG. 1 or 40 of FIG. 3 with a Smart Card connector 16 mounted thereto in accordance with the present invention. The Smart Card connector 16 defines an opening 19 into which a Smart Card 20 (shown in FIGS. 1, 2, and 3 only) is inserted, and comprises electrical connectors 51a and 51b, mounting tabs 53, and six electrical terminals 60 extending from six electrically conductive straps 61 and 62 for connection to six corresponding terminals (not shown) on the Smart Card 20. Ten electrical connectors 51a and 51b are shown. The first, second, third, and fourth centrally located electrical connectors 51a at opposing ends of the Smart Card connector 16 are interconnected to each other, respectively, by separate electrically conductive straps 61. Each of the electrically conductive straps 61 comprises a separate electrical connector terminal 60 (shown as a electrically conductive bump on the electrically conductive strap 61) for making an electrical connection between a Smart Card 20 (shown in FIGS. 1—3 only) and the main PC Board 50 via the associated electrically conductive strap 61 and the electrical connector 51a. Similarly, two electrical connectors 51b located on either side of the four centrally located electrical connectors 51a at the end opposing the opening 19 of the Smart Card connector 16 are power connectors. Each of the electrical connectors 51b is connected via a separate electrically conductive strap 62 to a separate one of the electrical connector terminals 60 (shown as a electrically conductive bump on the electrically conductive strap 62) for making a power connection between the Smart Card 20 and the main PC Board 50 via the associated electrically conductive strap 62 and the electrical connector 51b.

The main PC Board 50 is a component that is well known in the art. The PC Board 50 comprises a first (top) major surface 54 and a second opposing (bottom) major surface 55, and can be either a traditional single-sided PC Board or a double-sided PC Board. More particularly, a double-sided PC Board 50 means that electrical power wiring 56 and electrical signal wiring 58 are printed on both major surfaces 54 and 55 of the PC Board 50 so that various electrical components (not shown) such as resistors, transistors, integrated circuits, etc. can be mounted on these major surfaces and connected to the printed wiring 56 and 58. By utilizing a double-sided PC Board 50, twice the amount of circuitry can be accommodated verses a traditional single-sided PC Board 50 on which all wiring and electrical components are mounted on only one major surface (top or bottom) thereof.

The Smart Card connector 16 comprises four mounting tabs 53 for mounting the Smart Card connector 16 to the main PC Board 50 at a place where the Smart Card Connector 16 does not interfere with printed electrical wiring 56 and 58 and/or circuits (not shown) and/or electrical components (not shown) mounted on the first major surface 54 and/or second major surface 55 of the PC Board. Each of the four mounting tabs 53 of the Smart Card connector 16 is positioned near a separate corner of the Smart Card connector 16. Each mounting tab 53 comprises (a) a prong 59, and (b) a box-shaped spacer 57 formed on the prong 59 that contacts the upper surface 64 of the Smart Card connector 16 and the second (bottom) major surface 55 of the main PC Board 50 when the Smart Card connector 16 is placed against the main PC Board 50. The prong 59 of each of the four mounting tabs 53 is inserted into a separate aperture (not shown) in the main PC Board 50 and extends through the PC Board 50 to at least the first (top) major surface 54 of the main PC Board 50 to securely mount the Smart Card connector 16 to the main PC Board 50. Each of the electrical connectors 51a and 51b of the Smart Card connector 16 is inserted through a separate aperture (not shown) in the main PC Board 50, and is electrically connected (soldered) as required to a predetermined separate printed power lead 56 or printed signal lead 58 formed on the first (top) major surface 54 of the PC Board 50.

It is to be understood that the size of the groove 18 or 42, the specific type (contact or non-contact) or model of Smart Card 20, or the specific type (contact or non-contact) and model of Smart Card connector 16 are not critical to the present invention. Rather, the present invention is primarily concerned with locating the Smart Card 20 and its connector means 16 underneath a device like a CATV Converter box 10 with a direct connection to a main printed circuit board 50 to provide a space-savings within the box 10, and to make it more child-proof and less subject to an inadvertent removal or bumping of the Smart Card 20.

It is to be appreciated and understood that the specific embodiments of the invention described hereinabove are merely illustrative of the general principles of the invention. Various modifications may be made by those skilled in the art which are consistent with the principles set forth. For example, there are a variety of different ways of forming the groove 18 shown in FIGS. 1 and 2, or the groove 42 shown in FIG. 3, and inserting the Smart Card 20 into contact with electrical terminals of a Smart Card connector. For example, a power and signal passing means, such as the electrical terminals 60 (shown in FIG. 5 only) of the Smart Card connector 16, can be properly located in the bottom surface of the groove 18 or 42, where the groove 18 or 42 is approximately the size of the Smart Card 20. The Smart Card 20 can then be inserted into the groove 18 or 42 and into contact with the power and signal passing means in the bottom of the groove. Any suitable holding means can be used as, for example, spring loaded balls that recede into apertures defined in the side and/or ends of the groove to permit the Smart Card 20 to pass thereby when being inserted into the groove 18 or 42. Once the Smart Card 20 is inserted into the groove 18 or 42, the spring-loaded balls partially emerge from the apertures to hold the Smart Card 20 in place against the bottom of the groove 18 or 42 and the power and signal passing means in the bottom of the groove. The power and signal passing means in the bottom of the groove 18 or 42 can be extended to connect to the printed wiring 56 and 58 (shown in FIG. 5 only) on the printed circuit board 50 for electrically coupling the Smart Card 20 to circuits on the printed circuit board 50.

What is claimed is:

1. A device for receiving encrypted communication signals based on a predetermined encrypting algorithm comprising:
    a case comprising a top wall, a bottom wall, and four side walls coupling the top and bottom walls, the bottom wall defining a rectangular groove therein having first and second ends;
    a printed circuit board mounted within the case and comprising printed wiring formed thereon and circuit components disposed thereon which are electrically coupled to the printed wiring, the circuit components operating to decrypt the received encrypted communication signals; and
    an information card connector mounted on a first major surface of the printed circuit board and defining an opening at a first end thereof, the opening being aligned with the first end of the groove in the bottom wall of the case for receiving an information card storing a predetermined decrypting algorithm based on the predetermined encrypting algorithm that is placed in contact with the information card connector, the information card connector comprising terminal means for electrically coupling the information card with the information card connector and the printed wiring on the printed circuit board.

2. The device of claim 1 wherein the information card connector further comprises:
    mounting tabs for securely mounting the information card connector in a spaced-apart relationship to the printed circuit board; and
    electrical connectors for electrical coupling the terminal means with predetermined power leads and predetermined signal carrying leads of the printed wiring on the printed circuit board so as to transfer power and information signals, respectively, between the terminal means and the circuit components of the printed circuit board.

3. The device of claim 1 further comprising a hinged cover for selectively covering the groove in the bottom wall of the case.

4. The device of claim 1 wherein the information card is a Smart Card comprising:
    a microprocessor chip including a microprocessor and a confidential memory section for storing a predetermined decrypting algorithm based on the predetermined encrypting algorithm, and
    terminal means for making electrical connections to the terminal means of the information card connector so as to facilitate propagation of signals between the microprocessor chip and the terminal means of the information card connector.

5. The device of claim 1 wherein the bottom wall of the case further comprises an outwardly shaped protrusion adapted to encase the information card connector, the protrusion defining an opening for exposing the opening defined in the information card connector to the first end of the groove.

6. The device of claim 5 further comprising:
    a plurality of legs for supporting the case on a predetermined surface on which the case is to be placed, each leg extending a first predetermined distance from the bottom wall of the case; and the protrusion extends from the bottom wall of the case by a second distance which is equal to or less than the first distance of the plurality of the legs.

7. The device of claim 1 wherein the second end of the groove is formed in one of the side walls of the case.

8. The device of claim 1 wherein the device is a Cable Television converter box.

9. The device of claim 1 wherein the device is a computer.

10. A device for receiving encrypted communication signals based on a predetermined encrypting algorithm comprising:

a case comprising a top wall, a bottom wall, and four side walls coupling the top and bottom walls, the bottom wall defining a groove therein having first and second ends;

a printed circuit board mounted within the case and having first and second major surfaces which are substantially parallel to the bottom wall, the printed circuit board comprising printed wiring formed on at least one of the major surfaces, and circuit components disposed on at least one of the major surfaces and being electrically coupled to the printed wiring, the circuit components operating to decrypt the received encrypted communication signals; and an information card connector defining an opening at a first end thereof, the opening being aligned with the first end of the groove in the bottom wall of the case for receiving an information card storing a predetermined decrypting algorithm that is based on the predetermined encrypting algorithm that has been placed in contact with the information card connector, the information card connector comprising:

mounting tabs for securely mounting the information card connector on one of the first and second major surfaces of the printed circuit board;

electrical connectors for directly electrically coupling the information card connector with predetermined power leads and predetermined signal carrying leads of the printed wiring on the printed circuit board so as to transfer information between the information card connector and the circuit components of the printed circuit board; and terminal means for electrically coupling the information card with the electrical connectors.

11. The device of claim 10 wherein the device further comprises a hinged cover for selectively covering the groove in the bottom wall of the case.

12. The device of claim 10 wherein the information card is a Smart Card comprising a microprocessor chip comprising:

a microprocessor;

a confidential memory section for storing a predetermined decrypting algorithm based on the predetermined encrypting algorithm; and terminal means for making electrical connections to the terminal means of the information card connector so as to facilitate propagation of signals between the Smart Card and the terminal means of the information card connector.

13. The device of claim 10 wherein the bottom wall of the case further comprises:

an outwardly shaped protrusion adapted to encase the information card connector, the protrusion defining an opening for exposing the opening defined in the information card connector to the first end of the groove.

14. The device of claim 13 further comprising:

a plurality of legs for supporting the case on a predetermined surface on which the case is to be placed, each leg extending a first predetermined distance from the bottom wall of the case; and the protrusion extends from the bottom wall of the case by a second distance which is equal to or less than the first distance of the plurality of the legs.

15. The device of claim 10 wherein the second end of the groove is formed in one of the side walls of the case.

* * * * *